(12) United States Patent
Berneth et al.

(10) Patent No.: US 10,454,514 B2
(45) Date of Patent: *Oct. 22, 2019

(54) TERMINAL HOUSING, PANEL OF TERMINAL HOUSING, AND TERMINAL

(71) Applicant: Huawei Technologies Co., Ltd., Shenzhen (CN)

(72) Inventors: Tobias Berneth, Stockholm (SE); Qiang He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,556

(22) Filed: Oct. 31, 2018

(65) Prior Publication Data

US 2019/0068233 A1 Feb. 28, 2019

Related U.S. Application Data

(63) Continuation of application No. 15/591,664, filed on May 10, 2017, now Pat. No. 10,177,802.

(30) Foreign Application Priority Data

May 10, 2016 (CN) .................. 2016 2 0419003 U

(51) Int. Cl.
*H04B 1/3888* (2015.01)
*H04M 1/02* (2006.01)
(Continued)

(52) U.S. Cl.
CPC ......... *H04B 1/3888* (2013.01); *G06F 1/1626* (2013.01); *G06F 1/1656* (2013.01);
(Continued)

(58) Field of Classification Search
CPC ... H04B 1/3883; G06F 1/1626; G06F 1/1656; H04M 1/0252; H04M 1/0266; H04M 1/0277; H04M 1/185
(Continued)

(56) References Cited

U.S. PATENT DOCUMENTS 6,151,485 A * 11/2000 Crisp .................. H04M 1/0237
379/433.12
6,341,227 B1 * 1/2002 Moster ................. H04B 1/3833
455/550.1
(Continued)

FOREIGN PATENT DOCUMENTS

EP 2651105 A1 10/2013
EP 2993873 A1 3/2016
(Continued)

OTHER PUBLICATIONS

Foreign Communication From a Counterpart Application, European Application No. 17170470.3, European Office Action dated Mar. 28, 2019, 9 pages.
(Continued)

*Primary Examiner* — Hai V Nguyen
(74) *Attorney, Agent, or Firm* — Conley Rose, P.C.

(57) ABSTRACT

The terminal housing includes a first panel and a second panel, where a material of the first panel or a material of the second panel is glass. The first panel includes a first main face that is flat and straight and a first side face. The first main face has at least one first vertex angle, the first main face has two margins on two sides of the first vertex angle and connected to the first vertex angle, and cross sections in a through-thickness direction of the first panel and respectively vertical to the two margins connected to the first vertex angle are respectively a first through-thickness cross section and a second through-thickness cross section.

20 Claims, 10 Drawing Sheets

(51) Int. Cl.
*G06F 1/16* (2006.01)
*H04M 1/18* (2006.01)

(52) U.S. Cl.
CPC ....... *H04M 1/0252* (2013.01); *H04M 1/0266* (2013.01); *H04M 1/0277* (2013.01); *H04M 1/185* (2013.01)

(58) Field of Classification Search
USPC ............................................ 455/575.1, 90.1
See application file for complete search history.

(56) References Cited

U.S. PATENT DOCUMENTS

| | | | | |
|---|---|---|---|---|
| 6,915,140 | B2* | 7/2005 | Silverbrook | B41J 2/01 |
| | | | | 379/428.01 |
| 7,099,709 | B2* | 8/2006 | Hsu | H04B 15/00 |
| | | | | 455/348 |
| 7,116,780 | B2* | 10/2006 | Sun | H04M 1/0249 |
| | | | | 379/433.01 |
| 7,149,306 | B2* | 12/2006 | Pan | H04M 1/0283 |
| | | | | 379/433.01 |
| 7,158,809 | B2* | 1/2007 | Silverbrook | B41J 2/01 |
| | | | | 379/428.01 |
| 7,340,238 | B2* | 3/2008 | Napier-Clark | A45D 33/008 |
| | | | | 379/433.11 |
| 8,565,717 | B2* | 10/2013 | Galuszka | H04M 1/72541 |
| | | | | 340/537 |
| 9,057,702 | B2* | 6/2015 | Ozcan | G01N 21/6486 |
| 9,120,187 | B2* | 9/2015 | Maatta | B23P 11/00 |
| 9,686,046 | B2 | 6/2017 | El-Saidny et al. | |
| 9,864,403 | B2* | 1/2018 | Franklin | G06F 1/1626 |
| 10,177,802 | B2* | 1/2019 | Berneth | H04B 1/3888 |
| 2002/0183088 | A1 | 12/2002 | Silverbrook | B41J 2/01 |
| | | | | 455/550.1 |
| 2005/0088141 | A1* | 4/2005 | Lee | A45F 5/00 |
| | | | | 320/114 |
| 2005/0225624 | A1* | 10/2005 | Silverbrook | B41J 2/01 |
| | | | | 347/109 |
| 2006/0094479 | A1* | 5/2006 | Napier-Clark | A45D 33/008 |
| | | | | 455/575.1 |
| 2008/0227507 | A1* | 9/2008 | Joo | H04M 1/0266 |
| | | | | 455/575.8 |
| 2010/0103640 | A1* | 4/2010 | Brown | G06F 3/0414 |
| | | | | 361/829 |
| 2012/0238238 | A1* | 9/2012 | Galuszka | G08B 25/016 |
| | | | | 455/404.2 |
| 2012/0320340 | A1* | 12/2012 | Coleman, III | A61B 3/14 |
| | | | | 351/208 |
| 2013/0140965 | A1* | 6/2013 | Franklin | G06F 1/1626 |
| | | | | 312/223.1 |
| 2013/0330495 | A1* | 12/2013 | Maatta | B23P 11/00 |
| | | | | 428/68 |
| 2013/0335298 | A1 | 12/2013 | Karmanenko et al. | |
| 2014/0077727 | A1* | 3/2014 | Kennedy | H02J 7/025 |
| | | | | 315/326 |
| 2014/0152890 | A1* | 6/2014 | Rayner | G06F 1/1626 |
| | | | | 348/376 |
| 2014/0194270 | A1 | 7/2014 | Shiratori et al. | |
| 2014/0197380 | A1 | 7/2014 | Sung et al. | |
| 2014/0240689 | A1* | 8/2014 | Arbouzov | G01S 17/023 |
| | | | | 356/4.01 |
| 2014/0285956 | A1* | 9/2014 | Russell-Clarke | C03B 23/245 |
| | | | | 361/679.01 |
| 2015/0215439 | A1* | 7/2015 | Stanimirovic | H04M 1/215 |
| | | | | 455/572 |
| 2015/0229745 | A1 | 8/2015 | De Wind | |
| 2016/0306469 | A1* | 10/2016 | Kennedy | H02J 17/00 |
| 2017/0086551 | A1* | 3/2017 | Rayner | A45C 13/008 |
| 2017/0164512 | A1* | 6/2017 | Coulter | F24V 30/00 |
| 2018/0091962 | A1 | 3/2018 | Hernandez et al. | |

FOREIGN PATENT DOCUMENTS

| | | |
|---|---|---|
| JP | 2013545334 A | 12/2013 |
| JP | 2014148461 A | 8/2014 |
| KR | 20080084494 | 9/2008 |
| KR | 20080084494 A | 9/2008 |
| KR | 20140117491 | 10/2014 |
| KR | 20140117491 A | 10/2014 |
| WO | 2010027565 A2 | 3/2010 |

OTHER PUBLICATIONS

Foreign Communication From a Counterpart Application, Korean Application No. 10-2017-00558203, Korean Notice of Allowance dated Aug. 23, 2018, 3 pages.
Foreign Communication From a Counterpart Application, Japanese Application No. 2017-092794, English Translation of Japanese Office Action dated Oct. 23, 2018, 10 pages.
Foreign Communication From a Counterpart Application, Korean Application No. 10-2017-0058203, Korean Notice of Preliminary Rejection dated Mar. 20, 2018, 8 pages.
Foreign Communication From A Counterpart Application, Korean Application No. 10-2017-0058203, English Translation of Korean Notice of Preliminary Rejection dated Apr. 3, 2018, 8 pages.
Foreign Communication From A Counterpart Application, Korean Application No. 10-2017-0058203, Korean Notice of Allowance dated Aug. 23, 2018, 3 pages.
Foreign Communication From A Counterpart Application, Japanese Application No. 2017-092794, Japanese Office Action dated Oct. 23, 2018, 9 pages.
Foreign Communication From A Counterpart Application, Japanese Application No. 10-2017-092794, English Translation of Japanese Office Action dated Oct. 23, 2018, 10 pages.
Foreign Communication From A Counterpart Application, European Application No. 17170470.3, Extended European Search Report dated Nov. 29, 2017, 11 pages.

* cited by examiner

TERMINAL HOUSING, PANEL OF TERMINAL HOUSING, AND TERMINAL

CROSS-REFERENCE TO RELATED APPLICATION

This application is a continuation of U.S. patent application Ser. No. 15/591,664 filed on May 10, 2017, which claims priority to Chinese Patent Application No. 201620419033.4 filed on May 10, 2016. All of the aforementioned patent applications are hereby incorporated by reference in their entireties.

TECHNICAL FIELD

The present disclosure relates to the field of terminal technologies, and in particular, to a terminal housing, a panel of a terminal housing, and a terminal.

BACKGROUND

Currently, housings of some terminals, such as smartphones, on the market mainly include three parts, a glass touchpad, a middle frame, and a battery rear cover. For this type of terminal housing, there is generally a corner angle at a location where faces join. Generally, the corner angle is located at a location relatively prominent, and is more prone to be hit by another object compared with other parts of the terminal housing. After being hit, a corner angle location of the housing is prone to be knocked off or damaged. After the corner angle of the housing is knocked off or damaged, appearance of the terminal is affected, and the corner angle of the housing also fails to protect an internal part of the terminal. As a result, the internal part of the terminal is prone to be damaged.

SUMMARY

The present disclosure provides a terminal housing, a panel of a terminal housing, and a terminal in order to reduce a probability that the terminal housing is knocked off or crashed at a location where faces join, thereby maintaining a protective effect on an internal part of the terminal.

A first aspect of the present disclosure discloses a terminal housing, including a first panel and a second panel, where the first panel and the second panel are respectively snap-fit on front and rear sides of a terminal, the first panel and the second panel are disposed opposite to each other, a material of the first panel and/or a material of the second panel are/is glass, the first panel includes a first main face that is flat and straight and a first side face connected to a margin of the first main face, the first main face has at least one first vertex angle, the first main face has two margins on two sides of the first vertex angle and connected to the first vertex angle, and cross sections in a through-thickness direction of the first panel and that are respectively vertical to the two margins connected to the first vertex angle are respectively a first through-thickness cross section and a second through-thickness cross section, and a location of the at least one first vertex angle of the first main face is connected to the first side face at a junction of the location of the at least one first vertex angle and the first side face using a first vertex angle cambered face, inner- and outer-side faces of the first vertex angle cambered face are separately in a shape of a camber line on a first through-thickness cross section that passes through the first vertex angle, and the inner- and outer-side faces of the first vertex angle cambered face are separately in a shape of a camber line on a second through-thickness cross section that passes through the first vertex angle.

In this type of cambered face design of a terminal housing in which a location of at least one first vertex angle of a first main face is connected to a first side face at a junction of the location of the at least one first vertex angle and the first side face using a first vertex angle cambered face, there is no prominent corner angle such that the terminal housing is less prone to be hit by another object. This can reduce a probability that the terminal housing is knocked off or crashed at a location where faces join, thereby maintaining a protective effect on an internal part of a terminal. In addition, this type of cambered design, in which dual-curve-line three dimensional (3D) glass is used, of inner- and outer-side faces of the first vertex angle cambered face greatly enhances an aesthetic appeal of the terminal housing and makes an appearance of the terminal more gentle and flexible.

With reference to the first aspect, in a first possible implementation manner, the second panel includes a second main face that is flat and straight and a second side face connected to a margin of the second main face, the second main face has at least one second vertex angle, the second main face has two margins on two sides of the second vertex angle and connected to the second vertex angle, and cross sections in a through-thickness direction of the second panel and respectively vertical to the two margins connected to the second vertex angle are respectively a third through-thickness cross section and a fourth through-thickness cross section, and a location of the at least one second vertex angle of the second main face is connected to the second side face at a junction of the location of the at least one second vertex angle and the second side face using a second vertex angle cambered face, inner- and outer-side faces of the second vertex angle cambered face are separately in a shape of a camber line on a third through-thickness cross section that passes through the second vertex angle, and the inner- and outer-side faces of the second vertex angle cambered face are separately in a shape of a camber line on a fourth through-thickness cross section that passes through the second vertex angle.

In this type of cambered face design of a terminal housing in which a location of at least one second vertex angle of a second main face is connected to a second side face at a junction of the location of the at least one second vertex angle and the second side face using a first vertex angle cambered face, there is no prominent corner angle such that the terminal housing is less prone to be hit by another object. This can reduce a probability that the terminal housing is knocked off or crashed at a location where faces join, thereby maintaining a protective effect on an internal part of a terminal.

With reference to the first aspect or the first possible implementation manner, in a second possible implementation manner, the inner- and outer-side faces of the first vertex angle cambered face are separately in a shape of a camber line on each first through-thickness cross section.

With reference to the first aspect or the first possible implementation manner, in a third possible implementation manner, the inner- and outer-side faces of the first vertex angle cambered face are separately in a shape of a camber line on each second through-thickness cross section.

With reference to the first aspect or the first possible implementation manner, in a fourth possible implementation manner, the inner- and outer-side faces of the first vertex angle cambered face are separately in a shape of a camber line on each cross section that passes through the first vertex angle and in the through-thickness direction of the first panel.

With reference to the first aspect or the first possible implementation manner, in a fifth possible implementation manner, the inner- and outer-side faces of the first vertex angle cambered face are separately in a shape of a camber line on each cross section of the first panel and in a direction parallel to the first main face.

With reference to any one of the first aspect or the first to the fifth possible implementation manners, in a sixth possible implementation manner, the two margins of the first main face located on the two sides of the first vertex angle are straight edges or cambered edges.

With reference to any one of the first aspect or the first to the sixth possible implementation manners, in a seventh possible implementation manner, the first main face is a rectangle, and there are four first vertex angles.

With reference to any one of the first aspect or the first to the fifth possible implementation manners, in an eighth possible implementation manner, the first main face and the two margins connected to the two sides of the at least one first vertex angle are connected at a junction of the first main face and the first side face using a cambered face.

With reference to any one of the first aspect or the first to the fifth possible implementation manners, in a ninth possible implementation manner, the first side face is a cambered side face or a plate side face.

With reference to any one of the first aspect or the first to the ninth possible implementation manners, in a tenth possible implementation manner, the first side face surrounds a periphery of the first main face, and is connected to a margin of the periphery of the first main face.

With reference to any one of the first aspect or the first to the tenth possible implementation manners, in an eleventh possible implementation manner, a thickness of the first panel and/or a thickness of the second panel are/is even, and inner- and outer-side faces of the first panel and/or inner- and outer-side faces of the second panel are of a consistent shape.

With reference to any one of the first aspect or the first to the eleventh possible implementation manners, in a twelfth possible implementation manner, the terminal housing further includes a middle frame, and the first panel and the second panel are respectively assembled on two sides of the middle frame.

Optionally, the first panel and the second panel may be directly connected using a medium, for example, liquid glue, solid glue, or double-sided tape, or the first panel and the second panel may be directly connected in a mechanical manner, for example, connected by means of soldering, riveting, screws, or fasteners.

With reference to any one of the first aspect or the first to the twelfth possible implementation manners, in a thirteenth possible implementation manner, the first panel and the second panel are symmetrical relative to a first cross section located at a central position in a through-thickness direction of the terminal. In this way, an overall appearance of the terminal housing can be relatively symmetrical, improving a visual effect.

With reference to any one of the first aspect or the first to the thirteenth possible implementation manners, in a fourteenth possible implementation manner, a shape of an outer surface of the first main face is any one of an oblong, a trapezoid, a heart shape, a star shape, a regular hexagon, or a boat shape.

With reference to the fourteenth possible implementation manner, in a fifteenth possible implementation manner, a shape of the first main face is a rectangle, the margin of the first main face includes a first width edge and a second width edge in a width direction of the first main face and a first length edge and a second length edge in a length direction of the first main face, and at least one edge of the first width edge, the second width edge, the first length edge, and the second length edge and the first side face are connected at a junction of the at least one edge and the first side face using a cambered face.

With reference to the fifteenth possible implementation manner, in a sixteenth possible implementation manner, the first width edge and the second width edge are connected at a junction with the first side face using a cambered face, or the first length edge and the second length edge are connected at a junction with the first side face using a cambered face, or the first width edge, the second width edge, the first length edge, and the second length edge are connected at a junction with the first side face using a cambered face.

With reference to the sixteenth possible implementation manner, in a seventeenth possible implementation manner, a first cambered face is used for connection at a junction of the first width edge and the first side face, and a second cambered face is used for connection at a junction of the second width edge and the first side face, where the first cambered face and the second cambered face are asymmetrical relative to a second cross section located at a central position in a length direction of the terminal.

With reference to the sixteenth possible implementation manner, in an eighteenth possible implementation manner, a first cambered face is used for connection at a junction of the first width edge and the first side face, and a second cambered face is used for connection at a junction of the second width edge and the first side face, where the first cambered face and the second cambered face are symmetrical relative to a second cross section located at a central position in a length direction of the terminal.

With reference to the sixteenth possible implementation manner, in a nineteenth possible implementation manner, a third cambered face is used for connection at a junction of the first length edge and the first side face, and a fourth cambered face is used for connection at a junction of the second length edge and the first side face, where the third cambered face and the fourth cambered face are symmetrical relative to a third cross section located at a central position in a width direction of the terminal.

With reference to the sixteenth possible implementation manner, in a twentieth possible implementation manner, a first cambered face is used for connection at a junction of the first width edge and the first side face, a second cambered face is used for connection at a junction of the second width edge and the first side face, a third cambered face is used for connection at a junction of the first length edge and the first side face, and a fourth cambered face is used for connection at a junction of the second length edge and the first side face, where the first cambered face and the second cambered face are asymmetrical relative to a second cross section located at a central position in a length direction of the terminal, and the third cambered face and the fourth cambered face are symmetrical relative to a third cross section located at a central position in a width direction of the terminal, or the first cambered face and the second cambered face are symmetrical relative to a second cross section located at a central position in a length direction of the terminal, and the third cambered face and the fourth cambered face are symmetrical relative to a third cross section located at a central position in a width direction of the terminal.

With reference to any one of the first to the twentieth possible implementation manners, in a twenty-first possible implementation manner, a shape of an outer surface of the second main face is any one of an oblong, a trapezoid, a heart shape, a star shape, a regular hexagon, or a boat shape.

With reference to the twenty-first possible implementation manner, in a twenty-second possible implementation manner, a shape of the second main face is a rectangle, the margin of the second main face includes a third width edge and a fourth width edge in a width direction of the second main face and a third length edge and a fourth length edge in a length direction of the second main face, and at least one edge of the third width edge, the fourth width edge, the third length edge, and the fourth length edge and the second side face are connected at a junction of the at least one edge and the second side face using a cambered face.

With reference to the twenty-second possible implementation manner, in a twenty-third possible implementation manner, the third width edge and the fourth width edge are connected at a junction with the second side face using a cambered face, or the third length edge and the fourth length edge are connected at a junction with the second side face using a cambered face, or the third width edge, the fourth width edge, the third length edge, and the fourth length edge are connected at a junction with the second side face using a cambered face.

With reference to the twenty-third possible implementation manner, in a twenty-fourth possible implementation manner, a fifth cambered face is used for connection at a junction of the third width edge and the second side face, and a sixth cambered face is used for connection at a junction of the fourth width edge and the second side face, where the fifth cambered face and the sixth cambered face are asymmetrical relative to the second cross section located at the central position in the length direction of the terminal.

With reference to the twenty-third possible implementation manner, in a twenty-fifth possible implementation manner, a fifth cambered face is used for connection at a junction of the third width edge and the second side face, and a sixth cambered face is used for connection at a junction of the fourth width edge and the second side face, where the fifth cambered face and the sixth cambered face are symmetrical relative to the second cross section located at the central position in the length direction of the terminal.

With reference to the twenty-third possible implementation manner, in a twenty-sixth possible implementation manner, a seventh cambered face is used for connection at a junction of the third length edge and the second side face, and an eighth cambered face is used for connection at a junction of the fourth length edge and the second side face, where the seventh cambered face and the eighth cambered face are symmetrical relative to the third cross section located at the central position in the width direction of the terminal.

With reference to the twenty-third possible implementation manner, in a twenty-seventh possible implementation manner, a fifth cambered face is used for connection at a junction of the third width edge and the second side face, a sixth cambered face is used for connection at a junction of the fourth width edge and the second side face, a seventh cambered face is used for connection at a junction of the third length edge and the second side face, and an eighth cambered face is used for connection at a junction of the fourth length edge and the second side face, where the fifth cambered face and the sixth cambered face are asymmetrical relative to the second cross section located at the central position in the length direction of the terminal, and the seventh cambered face and the eighth cambered face are symmetrical relative to the third cross section located at the central position in the width direction of the terminal, or the fifth cambered face and the sixth cambered face are symmetrical relative to the second cross section located at the central position in the length direction of the terminal, and the seventh cambered face and the eighth cambered face are symmetrical relative to the third cross section located at the central position in the width direction of the terminal.

With reference to any one of the first aspect or the first to the twenty-seventh possible implementation manners of the first aspect, in a twenty-eighth possible implementation manner, the first panel and/or the second panel are/is display screens/a display screen.

With reference to any one of the first aspect or the first to the twenty-eighth possible implementation manners of the first aspect, in a twenty-ninth possible implementation manner, an overall form of the first panel or the second panel is any one of an oblong body with a cambered edge, a trapezoid body with a cambered edge, a heart-shaped body with a cambered edge, a star-shaped body with a cambered edge, a regular hexagon body with a cambered edge, or a boat-shaped body with a cambered edge.

A second aspect of the present disclosure discloses a panel of a terminal housing, where the panel is configured to be snap-fit on a front side or a rear side of a terminal, a material of the panel is glass, the panel includes a first main face that is flat and straight and a first side face connected to a margin of the first main face, the first main face has at least one vertex angle, the first main face has two margins on two sides of the vertex angle and connected to the vertex angle, and cross sections in a through-thickness direction of the first panel and that are respectively vertical to the two margins connected to the vertex angle are respectively a first through-thickness cross section and a second through-thickness cross section, and a location of the at least one vertex angle of the first main face is connected to the first side face at a junction of the location of the at least one vertex angle and the first side face using a vertex angle cambered face, inner- and outer-side faces of the vertex angle cambered face are separately in a shape of a camber line on a first through-vertex-angle cross section that passes through the vertex angle, and the inner- and outer-side faces of the vertex angle cambered face are separately in a shape of a camber line on a second through-vertex-angle cross section that passes through the vertex angle.

With reference to the second aspect, in a first possible implementation manner, the inner- and outer-side faces of the vertex angle cambered face are separately in a shape of a camber line on each first through-thickness cross section.

With reference to the second aspect, in a second possible implementation manner, the inner- and outer-side faces of the vertex angle cambered face are separately in a shape of a camber line on each second through-thickness cross section.

With reference to the second aspect, in a third possible implementation manner, the inner- and outer-side faces of the vertex angle cambered face are separately in a shape of a camber line on each cross section that passes through the vertex angle in the through-thickness direction of the panel.

With reference to the second aspect, in a fourth possible implementation manner, the inner- and outer-side faces of the vertex angle cambered face are separately in a shape of a camber line on each cross section of the panel in a direction parallel to the first main face.

With reference to any one of the second aspect or the first to the fourth possible implementation manners, in a fifth possible implementation manner, the two margins of the first main face located on the two sides of the vertex angle are straight edges or cambered edges.

With reference to any one of the second aspect or the first to the fifth possible implementation manners, in a sixth possible implementation manner, the first main face is a rectangle, and there are four first vertex angles.

With reference to any one of the second aspect or the first to the fourth possible implementation manners, in a seventh possible implementation manner, the first main face and the two margins connected to the two sides of the at least one vertex angle are connected to the first side face at a junction of the first main face and the first side face using a cambered face.

With reference to any one of the second aspect or the first to the fourth possible implementation manners, in an eighth possible implementation manner, the first side face is a cambered side face or a plate side face.

With reference to any one of the second aspect or the first to the eighth possible implementation manners, in a ninth possible implementation manner, the first side face surrounds a periphery of the first main face, and is connected to a margin of the periphery of the first main face.

With reference to any one of the second aspect or the first to the ninth possible implementation manners, in a tenth possible implementation manner, a thickness of the panel is even, and inner- and outer-side faces of the panel are of a consistent shape.

A third aspect of the present disclosure discloses a terminal, including the terminal housing according to any of the first aspect, a circuit board disposed in the terminal housing, and a part disposed on the circuit board, where a panel of the terminal housing includes the panel according to any of the second aspect.

In a possible implementation manner, the inner- and outer-side faces of the second vertex angle cambered face are separately in a shape of a camber line on each third through-thickness cross section.

In a possible implementation manner, the inner- and outer-side faces of the second vertex angle cambered face are separately in a shape of a camber line on each fourth through-thickness cross section.

In a possible implementation manner, the inner- and outer-side faces of the second vertex angle cambered face are separately in a shape of a camber line on each cross section that passes through the vertex angle in the through-thickness direction of the second panel.

In a possible implementation manner, the inner- and outer-side faces of the second vertex angle cambered face are separately in a shape of a camber line on each cross section of the second panel in a direction parallel to the second main face.

In a possible implementation manner, the two margins of the second main face located on the two sides of the second vertex angle are straight edges or cambered edges.

In a possible implementation manner, the second main face is a rectangle, and there are four second vertex angles.

In a possible implementation manner, the second main face and the two margins connected to the two sides of the at least one second vertex angle are connected at a junction of the second main face and the second side face using a cambered face.

In a possible implementation manner, the second side face is a cambered side face or a plate side face.

In a possible implementation manner, the second side face surrounds a periphery of the second main face, and is connected to a margin of the periphery of the second main face.

In a possible implementation manner, at least one of a visible-light camera, an infrared camera, an ambient-light sensor, or an infrared light emitting diode (LED) is disposed on the first panel. At least one of a visible-light camera, a camera flash, or a laser sensor is disposed on the second panel. Using this design approach, a richer appearance of the terminal housing is achieved, and design innovation in appearance details is not restricted.

In a possible implementation manner, a third cambered face is used for connection at a junction of the first length edge and the first side face, and a fourth cambered face is used for connection at a junction of the second length edge and the first side face, where the third cambered face and the fourth cambered face are asymmetrical relative to a third cross section located at the central position in the width direction of the terminal.

In a possible implementation manner, a seventh cambered face is used for connection at a junction of the third length edge and the second side face, and an eighth cambered face is used for connection at a junction of the fourth length edge and the second side face, where the seventh cambered face and the eighth cambered face are asymmetrical relative to the third cross section located at the central position in the width direction of the terminal.

It can be learned that, in the embodiments of the present disclosure, in this type of cambered face design of a terminal housing in which a location of at least one first vertex angle of a first main face is connected to a first side face at a junction of the location of the at least one first vertex angle and the first side face using a first vertex angle cambered face, there is no prominent corner angle such that the terminal housing is less prone to be hit by another object. This can reduce a probability that the terminal housing is knocked off or crashed at a location where faces join, thereby maintaining a protective effect on an internal part of a terminal.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
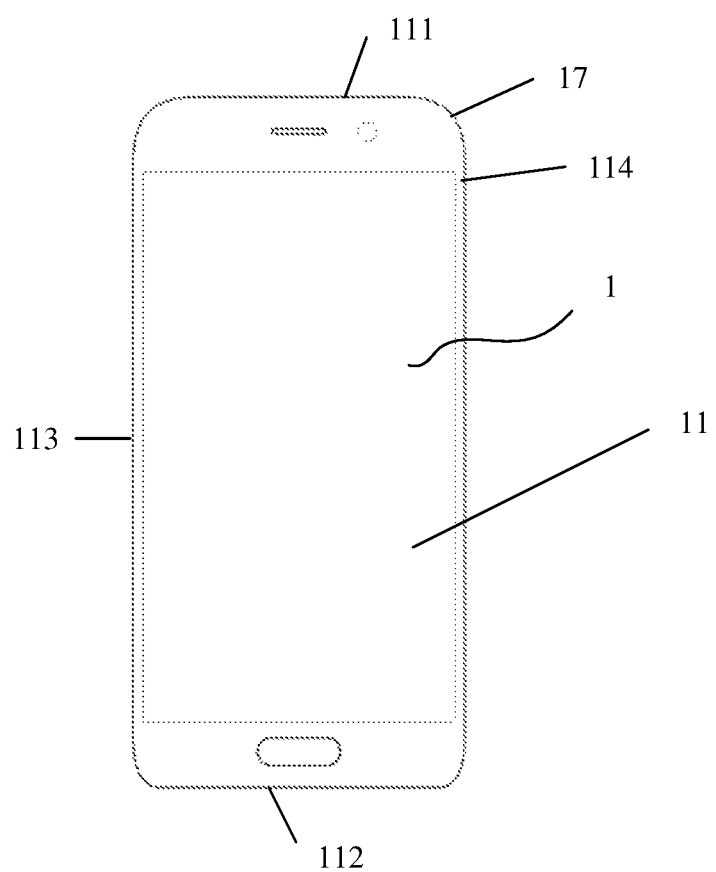
FIG. 1 is a schematic front view of a first panel disclosed in an embodiment of the present disclosure.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An "embodiment" mentioned in this application means that a specific feature, structure, or attribute described with reference to the embodiment may be included in at least one embodiment of the present disclosure. The phrase occurred at different locations in the specification does not necessarily refer to a same embodiment, or an independent or alternative embodiment exclusive of another embodiment. A person skilled in the art understands, in explicit and implicit manners, that an embodiment described in this application may be combined with another embodiment.

Embodiments of the present disclosure disclose a terminal housing, a panel of a terminal housing, and a terminal in order to reduce a probability that the terminal housing is knocked off or crashed at a location where faces join, thereby maintaining a protective effect on an internal part of the terminal. Detailed descriptions are separately provided in the following The terminal includes the terminal housing, a circuit board disposed in the terminal housing, and a part disposed on the circuit board. The terminal housing is configured to protect the internal part of the terminal, to prevent the internal part of the terminal from being damaged. The terminal may include but is not limited to different types of smart terminals such as a smartphone, a notebook computer, a personal computer (PC), a personal digital assistant (PDA), a mobile Internet device (MID), or a smart wearable device, such as a smart watch or a smart band. In the embodiments of the present disclosure, the terminal housing being applied in a smartphone is used as an example.

The terminal housing includes a first panel and a second panel. The first panel and the second panel are respectively snap-fit on front and rear sides of the terminal, and the first panel and the second panel are disposed opposite to each other. That "the first panel and the second panel are respectively snap-fit on front and rear sides of the terminal" may be understood as "the first panel is snap-fit on the front side of the terminal, and the second panel is snap-fit on the rear side of the terminal", or that "the first panel and the second panel are respectively snap-fit on front and rear sides of the terminal" may be understood as "the first panel is snap-fit on the rear side of the terminal, and the second panel is snap-fit on the front side of the terminal." This embodiment of the present disclosure sets no limitation thereto.

A material of the first panel and/or a material of the second panel are/is glass. The term "and/or" herein may be understood that three cases exist. The material of the first panel is glass, or the material of the second panel is glass, or both the material of the first panel and the material of the second panel are glass. All the glass herein is 3D glass. Both upper and lower surfaces of the 3D glass have a feature of a cambered face.

An overall form of the first panel or the second panel is any one of an oblong body with a cambered edge, a trapezoid body with a cambered edge, a heart-shaped body with a cambered edge, a star-shaped body with a cambered edge, a regular hexagon body with a cambered edge, or a boat-shaped body with a cambered edge. The first panel and the second panel are symmetrical relative to a first cross section located at a central position in a through-thickness direction of the terminal.

A thickness of the first panel and/or a thickness of the second panel are/is even, and inner- and outer-side faces of the first panel and/or inner- and outer-side faces of the second panel are of a consistent shape. The term "and/or" may be understood that three cases exist. The thickness of the first panel is even, and the inner- and outer-side faces of the first panel are of a consistent shape, or the thickness of the second panel is even, and the inner- and outer-side faces of the second panel are of a consistent shape, or the thickness of the first panel and the thickness of the second panel are even, and the inner- and outer-side faces of the first panel and the inner- and outer-side faces of the second panel are of a consistent shape.

The first panel and/or the second panel are/is display screens/a display screen. The term "and/or" may be understood that three cases exist. The first panel is a display screen, and in this case, the second panel may be a battery cover, or the second panel is a display screen, and in this case, the first panel may be a battery cover, or both the first panel and the second panel are display screens.

The first panel includes a first main face that is flat and straight and a first side face connected to a margin of the first main face, the first main face has at least one first vertex angle, the first main face has two margins on two sides of the first vertex angle connected to the first vertex angle, and cross sections in a through-thickness direction of the first panel and respectively vertical to the two margins connected to the first vertex angle are respectively a first through-thickness cross section and a second through-thickness cross section. The first vertex angle may be a sharp corner or may be a chamfer. This is not limited in this embodiment of the present disclosure. Optionally, a shape of an outer surface of the first main face is any one of an oblong, a trapezoid, a heart shape, a star shape, a regular hexagon, or a boat shape.

A location of the at least one first vertex angle of the first main face is connected to the first side face at a junction of the location of the at least one first vertex angle and the first side face using a first vertex angle cambered face, inner- and outer-side faces of the first vertex angle cambered face are separately in a shape of a camber line on a first through-thickness cross section that passes through the first vertex angle, and the inner- and outer-side faces of the first vertex angle cambered face are separately in a shape of a camber line on a second through-thickness cross section that passes through the first vertex angle. It can be learned that, in this type of design, in which dual-cambered-face 3D glass is used, of the first panel, there is no prominent corner angle such that the first panel is less prone to be hit by another object. This can reduce a probability that the terminal housing is knocked off or crashed at a location where faces join, thereby maintaining a protective effect on an internal part of the terminal.

In addition, in terms of detail design, at least one of a visible-light camera, an infrared camera, an ambient-light sensor, or an infrared LED may be further disposed on the first panel. Decoration of the first panel using printing ink may be performed in multiple manners, for example, by means of screen printing, coating, or movable printing, or a piece of membrane may be attached to the first panel. In this type of detail design manner of the first panel, a richer appearance is achieved, and design innovation in appearance details is not restricted.

The second panel includes a second main face that is flat and straight and a second side face connected to a margin of the second main face, the second main face has at least one second vertex angle, the second main face has two margins on two sides of the second vertex angle connected to the second vertex angle, and cross sections in a through-thickness direction of the second panel respectively vertical to the two margins connected to the second vertex angle are respectively a third through-thickness cross section and a fourth through-thickness cross section. The second vertex angle may be a sharp corner or may be a chamfer. This is not limited in this embodiment of the present disclosure. Optionally, a shape of an outer surface of the second main face is any one of an oblong, a trapezoid, a heart shape, a star shape, a regular hexagon, or a boat shape.

A location of the at least one second vertex angle of the second main face is connected to the second side face at a junction of the location of the at least one second vertex angle and the second side face using a second vertex angle cambered face, inner- and outer-side faces of the second vertex angle cambered face are separately in a shape of a camber line on a third through-thickness cross section that passes through the second vertex angle, and the inner- and outer-side faces of the second vertex angle cambered face are separately in a shape of a camber line on a fourth through-thickness cross section that passes through the second vertex angle. It can be learned that, in this type of design, in which dual-cambered-face 3D glass is used, of the second panel, there is no prominent corner angle such that the second panel is less prone to be hit by another object. This can reduce a probability that the terminal housing is knocked off or crashed at a location where faces join, thereby maintaining a protective effect on an internal part of the terminal.

In addition, in terms of detail design, at least one of a visible-light camera, a camera flash, or a laser sensor may be further disposed on the second panel. Decoration of the second panel using printing ink may be performed in multiple manners, for example, by means of screen printing, coating, or movable printing, or a piece of membrane may be attached to the second panel. In this type of detail design manner of the second panel, a richer appearance is achieved, and design innovation in appearance details is not restricted.

An overall form of the first panel may assume a shape of a plate, or a groove is disposed on an inner side of the first panel, where the groove holds an internal part of the terminal. An overall form of the second panel may assume a shape of a plate, or a groove is disposed on an inner side of the second panel, where the groove holds an internal part of the terminal.

Based on the foregoing descriptions of the overall forms of the first panel and the second panel, an overall structural form of the terminal housing mainly includes the following several types.

In a first type, the overall form of the first panel assumes a shape of a plate, and a groove is disposed on the inner side of the second panel, where the groove holds an internal part of the terminal.

In a second type, the overall form of the second panel assumes a shape of a plate, and a groove is disposed on the inner side of the first panel, where the groove holds an internal part of the terminal.

In a third type, a groove is disposed on the inner sides of both the first panel and the second panel, where the groove holds an internal part of the terminal.

Optionally, in the foregoing several combination manners, the terminal housing further includes a middle frame. The first panel and the second panel are respectively assembled on two sides of the middle frame. The middle frame may be prepared using metal, alloy, a polymer material, and various types of composite materials. A buffer material, such as foam, rubber, or plastic or a component may be used for buffering between the middle frame and the first panel and between the middle frame and the second panel.

Optionally, in the foregoing several combination manners, the first panel and the second panel may be directly connected using a medium, for example, liquid glue, solid glue, or double-sided tape, or the first panel and the second panel may be directly connected in a mechanical manner, for example, connected by means of soldering, riveting, screws, or fasteners.

The following first separately describes the cambered face design of the first panel and the second panel in the present disclosure.

Figure 2A:
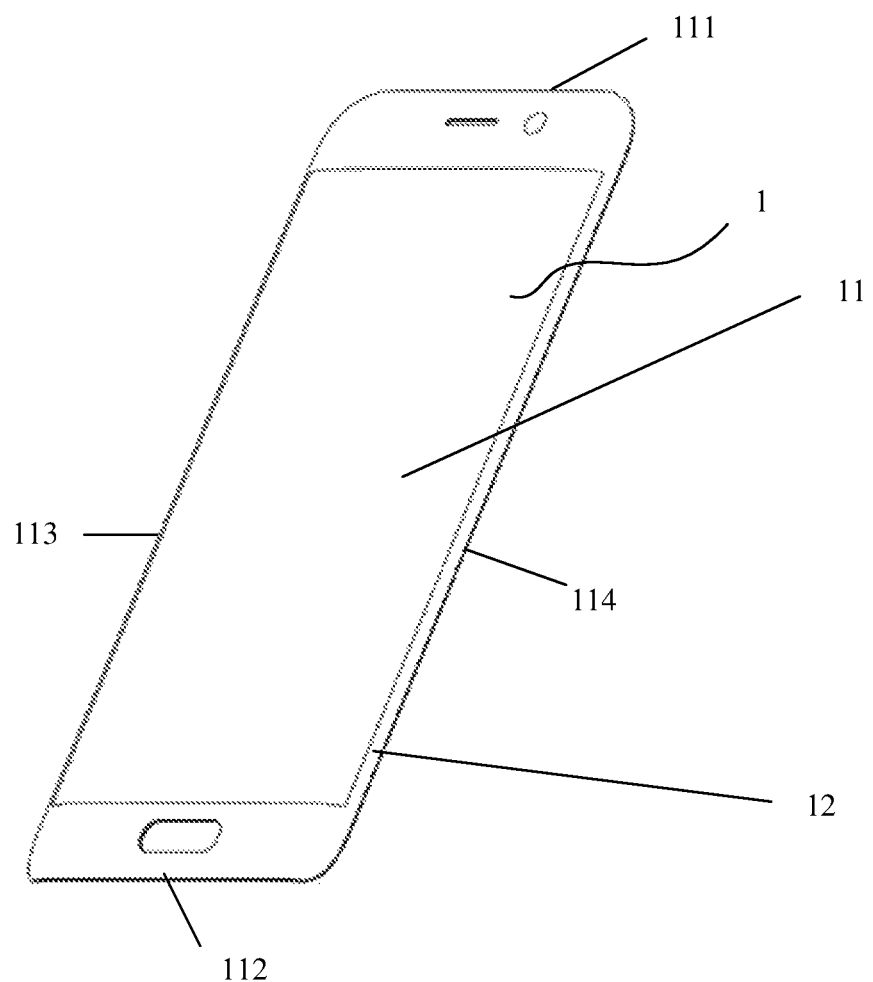
FIG. 2A is a 3D schematic structural diagram of a first panel disclosed in an embodiment of the present disclosure.
Figure 2B:
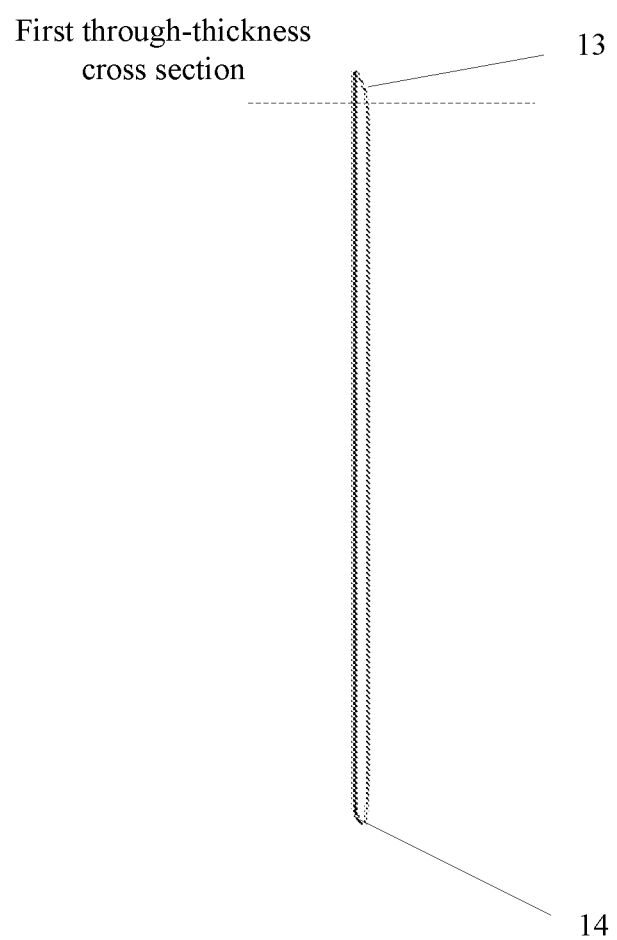
FIG. 2B is a schematic side view of a first panel disclosed in an embodiment of the present disclosure.
Figure 2C:
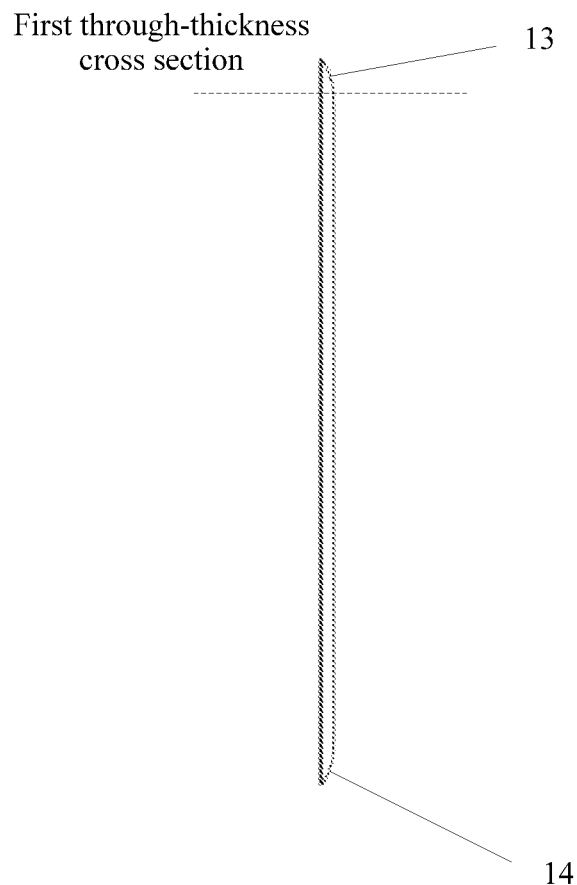
FIG. 2C is another schematic side view of a first panel disclosed in an embodiment of the present disclosure.
Figure 2D:
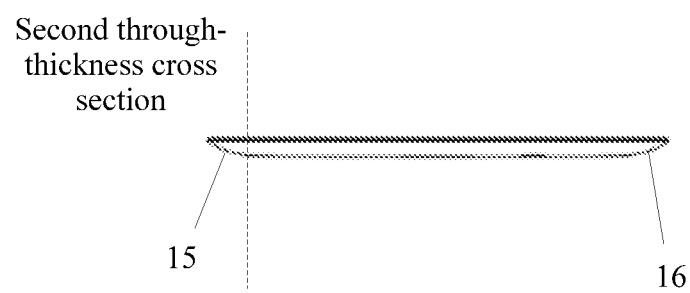
FIG. 2D is another schematic side view of a first panel disclosed in an embodiment of the present disclosure.

Refer to FIG. 1 to FIG. 2D. FIG. 1 is a schematic front view of a first panel disclosed in an embodiment of the present disclosure. FIG. 2A is a 3D schematic structural diagram of a first panel disclosed in an embodiment of the present disclosure. FIG. 2B is a schematic side view of a first panel disclosed in an embodiment of the present disclosure. FIG. 2C is another schematic side view of a first panel disclosed in an embodiment of the present disclosure. FIG. 2D is another schematic side view of a first panel disclosed in an embodiment of the present disclosure. An overall form of the first panel is an oblong body with a cambered edge, and a shape of the first main face is a rectangle.

As shown in FIG. 1 and FIG. 2A, the first panel 1 includes a first main face 11 that is flat and straight and a first side face 12 connected to a margin of the first main face 11, the first main face 11 has at least one first vertex angle 17, the first main face 11 has two margins on two sides of the first vertex angle 17 and connected to the first vertex angle 17, and cross sections in a through-thickness direction of the first panel 1 respectively vertical to the two margins connected to the first vertex angle 17 are respectively a first through-thickness cross section (as shown in FIG. 2B and FIG. 2C) and a second through-thickness cross section (as shown in FIG. 2D).

A location of the at least one first vertex angle 17 of the first main face 11 is connected to the first side face 12 at a junction of the location of the at least one first vertex angle 17 and the first side face 12 using a first vertex angle cambered face 13 (as shown in FIG. 2B or FIG. 2C), inner- and outer-side faces of the first vertex angle cambered face 13 are separately in a shape of a camber line on a first through-thickness cross section that passes through the first vertex angle 17, and the inner- and outer-side faces of the first vertex angle cambered face 13 are separately in a shape of a camber line on a second through-thickness cross section that passes through the first vertex angle 17.

Optionally, the inner- and outer-side faces of the first vertex angle cambered face 13 are separately in a shape of a camber line on each first through-thickness cross section.

Optionally, the inner- and outer-side faces of the first vertex angle cambered face 13 are separately in a shape of a camber line on each second through-thickness cross section.

Optionally, the inner- and outer-side faces of the first vertex angle cambered face 13 are separately in a shape of a camber line on each cross section that passes through the first vertex angle 17 in the through-thickness direction of the first panel 1.

Optionally, the inner- and outer-side faces of the first vertex angle cambered face 13 are separately in a shape of a camber line on each cross section of the first panel 1 and in a direction parallel to the first main face 11.

Optionally, the two margins of the first main face 11 located on the two sides of the first vertex angle 17 are straight edges or cambered edges.

Optionally, the first main face 11 is a rectangle, and there are four first vertex angles 17.

Optionally, the first main face 11 and the two margins connected to the two sides of the at least one first vertex angle 17 are connected at a junction of the first main face 11 and the first side face 12 using a cambered face.

Optionally, the first side face 12 is a cambered side face or a plate side face.

Optionally, the first side face 12 surrounds a periphery of the first main face 11, and is connected to a margin of the periphery of the first main face 11.

As shown in FIG. 1 or FIG. 2A, the margin of the first main face 11 includes a first width edge 111 and a second width edge 112 in a width direction of the first main face 11 and a first length edge 113 and a second length edge 114 in a length direction of the first main face 11, and at least one edge of the first width edge 111, the second width edge 112, the first length edge 113, and the second length edge 114 and the first side face 12 are connected at a junction of the at least one edge and the first side face 12 using a cambered face. This type of cambered-face design of the first panel 1 may greatly enhance an aesthetic appeal of a terminal housing and make an appearance of a terminal more gentle and flexible.

As shown in FIG. 2B, a first cambered face 13 is used for connection at a junction of the first width edge 111 and the first side face 12, and a second cambered face 14 is used for connection at a junction of the second width edge 112 and the first side face 12. The first cambered face 13 and the second cambered face 14 are asymmetrical relative to a second cross section located at a central position in a length direction of the terminal. That is, degrees of curvature of the first cambered face 13 and the second cambered face 14 are different. Generally, a degree of curvature of a cambered face may be described using a curvature parameter, such as a radian, inclination, curvature, or a curvature radius. A corresponding degree of curvature of a cambered face varies according to a curvature parameter.

Optionally, as shown in FIG. 2C, the first cambered face 13 and the second cambered face 14 are symmetrical relative to a second cross section located at a central position in a length direction of the terminal.

As shown in FIG. 2D, a third cambered face 15 is used for connection at a junction of the first length edge 113 and the first side face 12, and a fourth cambered face 16 is used for connection at a junction of the second length edge 114 and the first side face 12, where the third cambered face 15 and the fourth cambered face 16 are symmetrical relative to a third cross section located at a central position in a width direction of the terminal. In addition, optionally, the third cambered face 15 and the fourth cambered face 16 are asymmetrical relative to a third cross section located at the central position in the width direction of the terminal and this is not illustrated.

It can be learned that, in this type of cambered face design of a terminal housing in which a location of at least one first vertex angle of a first main face is connected to a first side face at a junction of the location of the at least one first vertex angle and the first side face using a first vertex angle cambered face, there is no prominent corner angle such that the terminal housing is less prone to be hit by another object. This can reduce a probability that the terminal housing is knocked off or crashed at a location where faces join, thereby maintaining a protective effect on an internal part of a terminal. In addition, this type of cambered design, in which dual-curve-line 3D glass is used, of inner- and outer-side faces of the first vertex angle cambered face greatly enhances an aesthetic appeal of the terminal housing and makes an appearance of the terminal more gentle and flexible.

Figure 3:
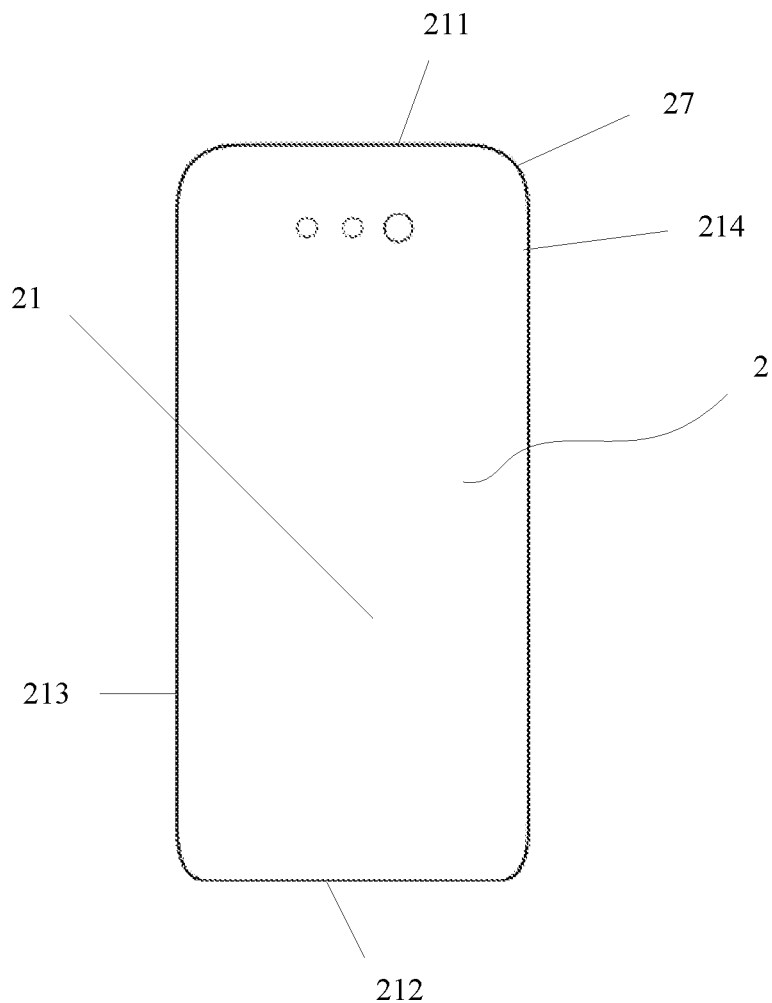
FIG. 3 is a schematic front view of a second panel disclosed in an embodiment of the present disclosure.
Figure 4A:
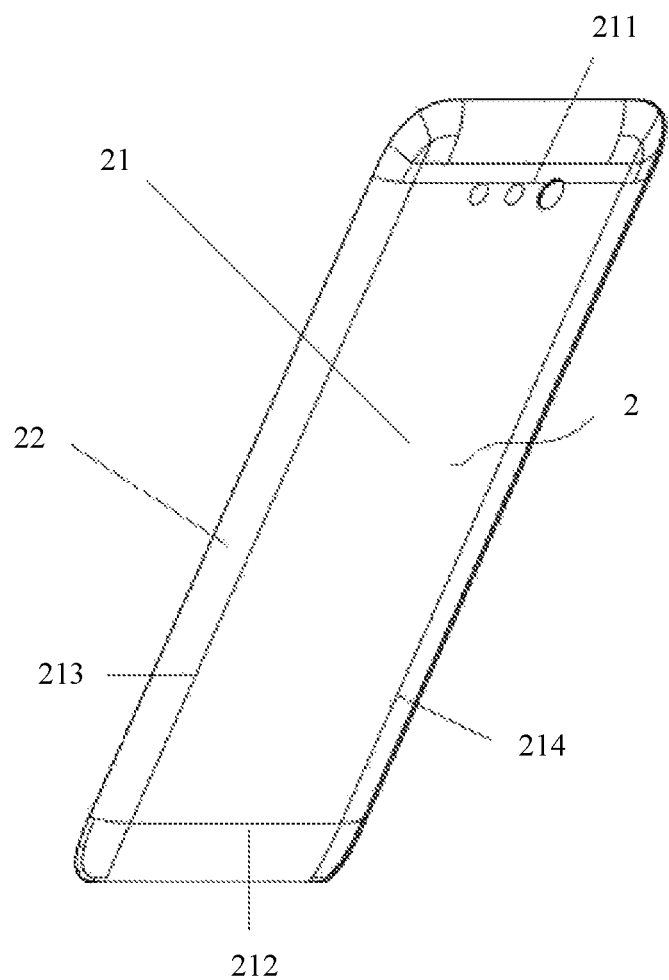
FIG. 4A is a 3D schematic structural diagram of a second panel disclosed in an embodiment of the present disclosure.
Figure 4B:
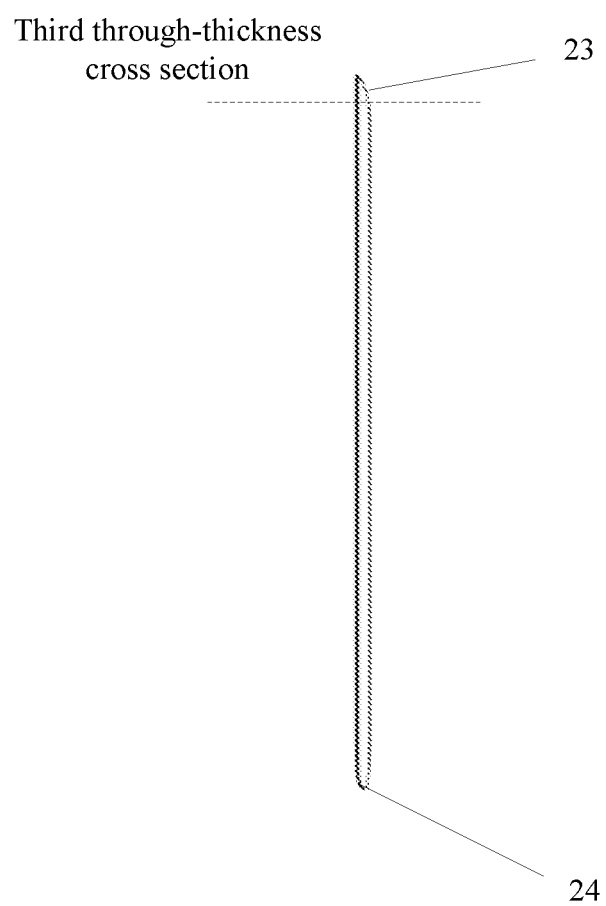
FIG. 4B is a schematic side view of a second panel disclosed in an embodiment of the present disclosure.
Figure 4C:
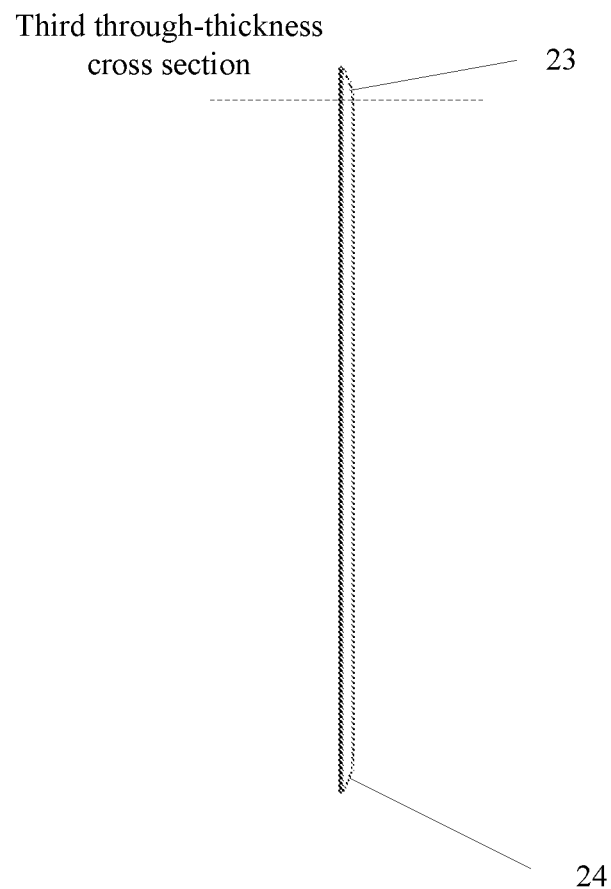
FIG. 4C is another schematic side view of a second panel disclosed in an embodiment of the present disclosure.
Figure 4D:
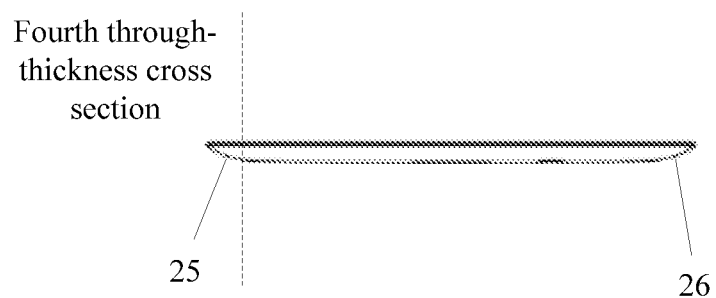
FIG. 4D is another schematic side view of a second panel disclosed in an embodiment of the present disclosure.

Refer to FIG. 3 to FIG. 4D. FIG. 3 is a schematic front view of a second panel disclosed in an embodiment of the present disclosure. FIG. 4A is a 3D schematic structural diagram of a second panel disclosed in an embodiment of the present disclosure. FIG. 4B is a schematic side view of a second panel disclosed in an embodiment of the present disclosure. FIG. 4C is another schematic side view of a second panel disclosed in an embodiment of the present disclosure. FIG. 4D is another schematic side view of a second panel disclosed in an embodiment of the present disclosure. An overall form of the second panel is an oblong body with a cambered edge, and a shape of the second main face is a rectangle.

As shown in FIG. 3 and FIG. 4A, the second panel 2 includes a second main face 21 that is flat and straight and a second side face 22 connected to a margin of the second main face 21, the second main face 21 has at least one second vertex angle 27, the second main face 21 has two margins on two sides of the second vertex angle 27 and connected to the second vertex angle 27, and cross sections in a through-thickness direction of the second panel 2 and respectively vertical to the two margins connected to the second vertex angle 27 are respectively a third through-thickness cross section (as shown in FIG. 4B and FIG. 4C) and a fourth through-thickness cross section (as shown in FIG. 4D).

A location of the at least one second vertex angle 27 of the second main face 21 is connected to the second side face 22 at a junction of the location of the at least one second vertex angle 27 and the second side face 22 using a second vertex angle cambered face 23 (as shown in FIG. 4B or FIG. 4C), inner- and outer-side faces of the second vertex angle cambered face 23 are separately in a shape of a camber line on a third through-thickness cross section that passes through the second vertex angle 27, and the inner- and outer-side faces of the second vertex angle cambered face 23 are separately in a shape of a camber line on a fourth through-thickness cross section that passes through the second vertex angle 27.

Optionally, the inner- and outer-side faces of the second vertex angle cambered face 23 are separately in a shape of a camber line on each third through-thickness cross section.

Optionally, the inner- and outer-side faces of the second vertex angle cambered face 23 are separately in a shape of a camber line on each fourth through-thickness cross section.

Optionally, the inner- and outer-side faces of the second vertex angle cambered face 23 are separately in a shape of a camber line on each cross section that passes through the second vertex angle 27 in the through-thickness direction of the second panel 2.

Optionally, the inner- and outer-side faces of the second vertex angle cambered face 23 are separately in a shape of a camber line on each cross section of the second panel 2 in a direction parallel to the second main face 21.

Optionally, the two margins of the second main face 21 located on the two sides of the second vertex angle 27 are straight edges or cambered edges.

Optionally, the second main face 21 is a rectangle, and there are four second vertex angles 27.

Optionally, the second main face 21 and the two margins connected to the two sides of the at least one second vertex angle 27 are connected at a junction of the second main face 21 and the second side face 22 using a cambered face.

Optionally, the second side face 22 is a cambered side face or a plate side face.

Optionally, the second side face 22 surrounds a periphery of the second main face 21, and is connected to a margin of the periphery of the second main face 21.

As shown in FIG. 3 or FIG. 4A, the margin of the second main face 21 includes a third width edge 211 and a fourth width edge 212 in a width direction of the second main face 21 and a third length edge 213 and a fourth length edge 214 in a length direction of the second main face 21, and at least one edge of the third width edge 211, the fourth width edge 212, the third length edge 213, and the fourth length edge 214 and the second side face 22 are connected at a junction of the at least one edge and the second side face 22 using a cambered face. This type of cambered-face design of the second panel 2 may greatly enhance an aesthetic appeal of a terminal housing and make an appearance of a terminal more gentle and flexible.

As shown in FIG. 4B, a fifth cambered face 23 is used for connection at a junction of the third width edge 211 and the second side face 22, and a sixth cambered face 24 is used for connection at a junction of the fourth width edge 212 and the second side face 22. The fifth cambered face 23 and the sixth cambered face 24 are asymmetrical relative to the second cross section located at the central position in the length direction of the terminal. That is, degrees of curvature of the fifth cambered face 23 and the sixth cambered face 24 are different. Generally, a degree of curvature of a cambered face may be described using a curvature parameter, such as a radian, inclination, curvature, or a curvature radius. A corresponding degree of curvature of a cambered face varies according to a curvature parameter.

Optionally, as shown in FIG. 4C, the fifth cambered face 23 and the sixth cambered face 24 are symmetrical relative to the second cross section located at the central position in the length direction of the terminal.

As shown in FIG. 4D, a seventh cambered face 25 is used for connection at a junction of the third length edge 213 and the second side face 22, and an eighth cambered face 26 is used for connection at a junction of the fourth length edge 214 and the second side face 22, where the seventh cambered face 25 and the eighth cambered face 26 are symmetrical relative to the third cross section located at the central position in the width direction of the terminal. In addition, optionally, the seventh cambered face 25 and the eighth cambered face 26 are asymmetrical relative to the third cross section located at the central position in the width direction of the terminal, and this is not illustrated.

It can be learned that, in this type of cambered face design of a terminal housing in which a location of at least one second vertex angle 27 of a second main face 21 is connected to a second side face 22 at a junction of the location of the at least one second vertex angle 27 and the second side face 22 using a second vertex angle 27 cambered face, there is no prominent corner angle, and the terminal housing is less prone to be hit by another object. This can reduce a probability that the terminal housing is knocked off or crashed at a location where faces join, thereby maintaining a protective effect on an internal part of a terminal. In addition, this type of cambered design, in which dual-curve-line 3D glass is used, of inner- and outer-side faces of the second vertex angle 27 cambered face greatly enhances an aesthetic appeal of the terminal housing and makes an appearance of the terminal more gentle and flexible.

Based on the foregoing descriptions of the cambered-face design of the first panel and the second panel, the following describes several cambered-face design manners of a terminal housing.

Figure 5A:
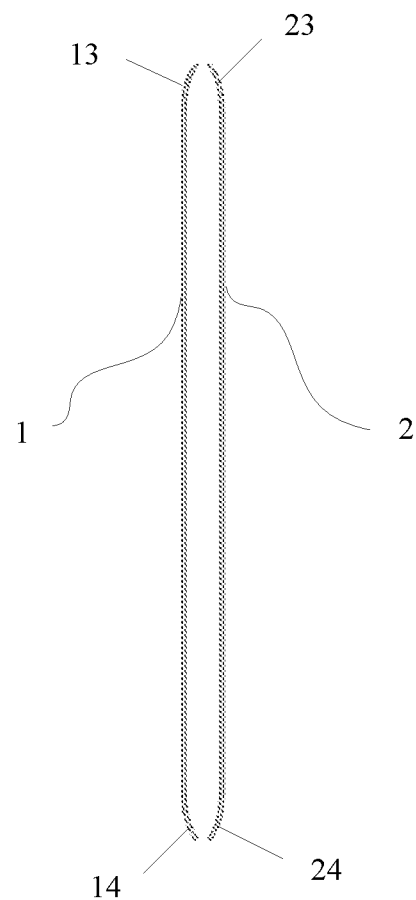
FIG. 5A is a schematic sectional view of a first implementation manner of a terminal housing disclosed in an embodiment of the present disclosure.
Figure 5B:
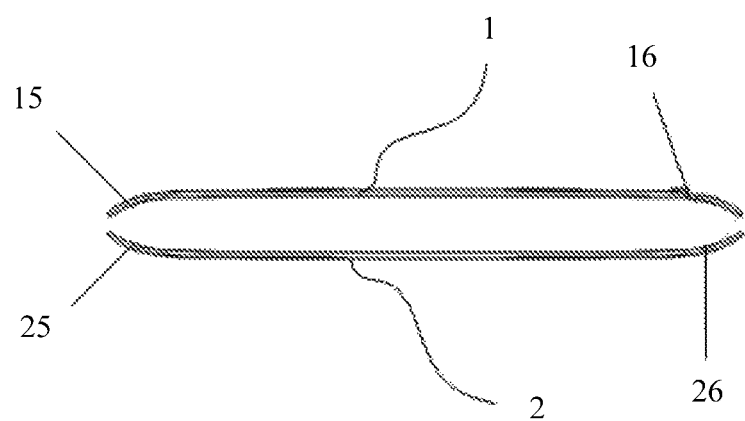
FIG. 5B is another schematic sectional view of a first implementation manner of a terminal housing disclosed in an embodiment of the present disclosure.

Refer to FIG. 5A and FIG. 5B. FIG. 5A is a schematic sectional view of a first implementation manner of a terminal housing disclosed in an embodiment of the present disclosure. FIG. 5B is another schematic sectional view of a first implementation manner of a terminal housing disclosed in an embodiment of the present disclosure. A cross section shown in FIG. 5A is a cross section located at the central position in the width direction of the terminal, that is, the third cross section. A cross section shown in FIG. 5B is a cross section located at the central position in the length direction of the terminal, that is, the second cross section.

As shown in FIG. 5A and FIG. 5B, a cambered face of the first panel 1 and a cambered face of the second panel 2 both use symmetrical design. Further, the first cambered face 13 and the second cambered face 14 are symmetrical relative to the second cross section located at the central position in the length direction of the terminal, the fifth cambered face 23 and the sixth cambered face 24 are symmetrical relative to the second cross section located at the central position in the length direction of the terminal, the third cambered face 15 and the fourth cambered face 16 are symmetrical relative to the third cross section located at the central position in the width direction of the terminal, and the seventh cambered face 25 and the eighth cambered face 26 are symmetrical relative to the third cross section located at the central position in the width direction of the terminal. Generally, a degree of curvature of a cambered face may be described using a curvature parameter, such as a radian, inclination, curvature, or a curvature radius. A corresponding degree of curvature of a cambered face varies according to a curvature parameter. That is, a curvature parameter of the first cambered face 13 and a curvature parameter of the second cambered face 14 are the same, a curvature parameter of the fifth cambered face 23 and a curvature parameter of the sixth cambered face 24 are the same, a curvature parameter of the third cambered face 15 and a curvature parameter of the fourth cambered face 16 are the same, and a curvature parameter of the seventh cambered face 25 and a curvature parameter of the eighth cambered face 26 are the same.

In this embodiment of the present disclosure, both the first main face and the second main face assume a shape of a rectangle. Both a material of the first panel 1 and a material of the second panel 2 are glass. Both the first panel 1 and the second panel 2 use design in which dual-cambered-face 3D glass is used. In this way, there is no prominent corner angle on a terminal housing such that the terminal housing is less prone to be hit by another object. This can reduce a probability that the terminal housing is knocked off or crashed at a location where faces join, thereby maintaining a protective effect on an internal part of a terminal. In addition, the cambered face of the first panel 1 and the cambered face of the second panel 2 use symmetrical design. This greatly enhances an aesthetic appeal of symmetry of the terminal housing and makes an appearance of the terminal more gentle and flexible.

Figure 6A:
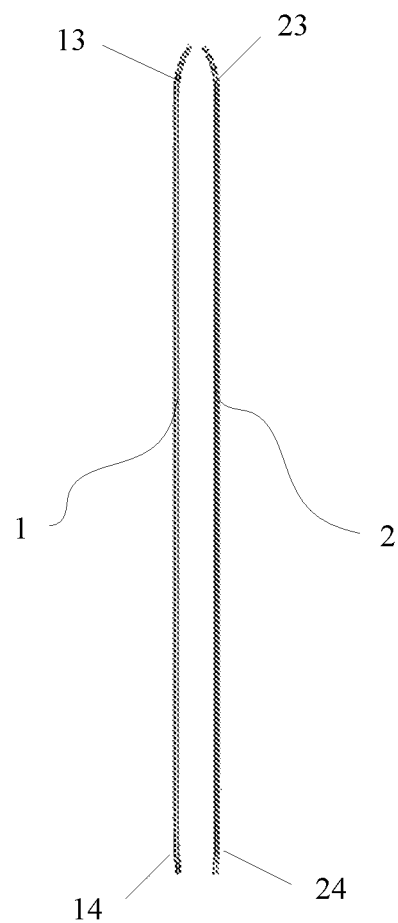
FIG. 6A is a schematic sectional view of a second implementation manner of a terminal housing disclosed in an embodiment of the present disclosure.
Figure 6B:
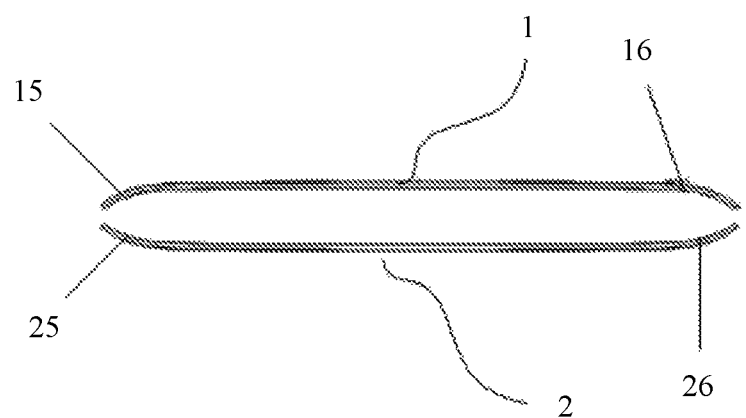
FIG. 6B is another schematic sectional view of a second implementation manner of a terminal housing disclosed in an embodiment of the present disclosure.

Refer to FIG. 6A and FIG. 6B. FIG. 6A is a schematic sectional view of a second implementation manner of a terminal housing disclosed in an embodiment of the present disclosure. FIG. 6B is another schematic sectional view of a second implementation manner of a terminal housing disclosed in an embodiment of the present disclosure. A cross section shown in FIG. 6A is a cross section located at the central position in the width direction of the terminal, that is, the third cross section. A cross section shown in FIG. 6B is a cross section located at the central position in the length direction of the terminal, that is, the second cross section.

As shown in FIG. 6A and FIG. 6B, a part of a cambered face of the first panel 1 and a part of a cambered face of the second panel 2 both use asymmetrical design. Further, the first cambered face 13 and the second cambered face 14 are asymmetrical relative to the second cross section located at the central position in the length direction of the terminal, the fifth cambered face 23 and the sixth cambered face 24 are asymmetrical relative to the second cross section located at the central position in the length direction of the terminal, the third cambered face 15 and the fourth cambered face 16 are symmetrical relative to the third cross section located at the central position in the width direction of the terminal, and the seventh cambered face 25 and the eighth cambered face 26 are symmetrical relative to the third cross section located at the central position in the width direction of the terminal. Generally, a degree of curvature of a cambered face may be described using a curvature parameter, such as a radian, inclination, curvature, or a curvature radius. A corresponding degree of curvature of a cambered face varies according to a curvature parameter. That is, a curvature parameter of the first cambered face 13 and a curvature parameter of the second cambered face 14 are different, a curvature parameter of the fifth cambered face 23 and a curvature parameter of the sixth cambered face 24 are different, a curvature parameter of the third cambered face 15 and a curvature parameter of the fourth cambered face 16 are the same, and a curvature parameter of the seventh cambered face 25 and a curvature parameter of the eighth cambered face 26 are the same.

In this embodiment of the present disclosure, both the first main face and the second main face assume a shape of a rectangle. Both a material of the first panel 1 and a material of the second panel 2 are glass. Both the first panel 1 and the second panel 2 use design in which dual-cambered-face 3D glass is used. In this way, there is no prominent corner angle on a terminal housing such that the terminal housing is less prone to be hit by another object. This can reduce a probability that the terminal housing is knocked off or crashed at a location where faces join, thereby maintaining a protective effect on an internal part of a terminal. In addition, a cambered face of the first panel 1 and a cambered face of the second panel 2 use asymmetrical design such that an appearance of the terminal housing has a characteristic of particularity. This meets a personalized requirement of a user, improving user experience.

What are disclosed above are merely examples of embodiments of the present disclosure, and certainly are not intended to limit the protection scope of the present disclosure. Any equivalent modification made in accordance with the claims of the present disclosure shall fall within the scope of the present disclosure.

What is claimed is:

1. A panel of a terminal housing, wherein the panel is configured to be snap-fit on a front side or a rear side of a terminal, and wherein the panel comprises:
   a first main face that is flat and straight; and
   a first side face coupled to a margin of the first main face, wherein a material of the panel is glass, wherein the first main face comprises at least one first vertex angle, wherein two margins on two sides of the at least one first vertex angle are coupled to the at least one first vertex angle, wherein cross sections in a through-thickness direction of the panel that are respectively vertical to the two margins coupled to the at least one first vertex angle are respectively a first through-thickness cross section and a second through-thickness cross section, wherein a location of the at least one first vertex angle of the first main face is coupled to the first side face at a junction of the location of the at least one first vertex angle and the first side face using a first vertex angle cambered face, wherein an inner-side face and an outer-side face of the first vertex angle cambered face are separately in a shape of a camber line on the first through-thickness cross section that passes through the at least one first vertex angle, wherein the inner-side face and the outer-side face of the first vertex angle cambered face is separately in a shape of a camber line on the second through-thickness cross section that passes through the at least one first vertex angle, wherein a shape of the first main face is a rectangle, wherein the margin of the first main face comprises a first width edge and a second width edge in a width direction of the first main face, wherein a first cambered face is used for coupling at a junction of the first width edge and the first side face, wherein a second cambered face is used for coupling at a junction of the second width edge and the first side face, and wherein the first cambered face and the second cambered face are asymmetrical relative to a second cross section located at a central position in a length direction of the terminal.

2. The panel of the terminal housing of claim 1, wherein the inner-side face and the outer-side face of the first vertex angle cambered face are separately in a shape of a camber line on each first through-thickness cross section.

3. The panel of the terminal housing of claim 1, wherein the inner-side face and the outer-side face of the first vertex angle cambered face are separately in a shape of a camber line on each second through-thickness cross section.

4. The panel of the terminal housing of claim 1, wherein the inner-side face and the outer-side face of the first vertex angle cambered face are separately in a shape of a camber line on each cross section that passes through the at least one first vertex angle in the through-thickness direction of the panel.

5. The panel of the terminal housing of claim 1, wherein the inner-side face and the outer-side face of the first vertex angle cambered face are separately in a shape of a camber line on each cross section of the panel in a direction parallel to the first main face.

6. The panel of the terminal housing of claim 1, wherein the two margins of the first main face located on the two sides of the at least one first vertex angle are straight edges or cambered edges.

7. The panel of the terminal housing of claim 1, wherein the two margins of the first main face coupled to the two sides of the at least one first vertex angle and the first side face are coupled at a junction of the two margins of the first main face and the first side face using a cambered face.

8. The panel of the terminal housing of claim 1, wherein the first side face is a cambered side face or a plate side face.

9. The panel of the terminal housing of claim 1, wherein the first side face surrounds a periphery of the first main face and is coupled to a margin of the periphery of the first main face.

10. The panel of the terminal housing of claim 1, wherein a thickness of the panel is even, and the inner-side face and the outer-side face of the panel are of a consistent shape.

11. The panel of the terminal housing of claim 1, further comprising a middle frame, and the panel is assembled on one side of the middle frame.

12. The panel of the terminal housing of claim 1, wherein a third cambered face is used for coupling at a junction of a first length edge and the first side face, a fourth cambered face is used for coupling at a junction of a second length edge and the first side face, and the third cambered face and the fourth cambered face is symmetrical relative to a third cross section located at a central position in a width direction of the terminal.

13. The panel of the terminal housing of claim 1, wherein the panel is a display screen.

14. A terminal comprising:
a terminal housing;
a circuit board disposed in the terminal housing; and
a part disposed on the circuit board, wherein the terminal housing comprises a panel, wherein the panel is snap-fit on front or rear sides of a terminal, wherein a material of the panel is glass, wherein the panel comprises a first main face that is flat and straight, wherein a first side face is coupled to a margin of the first main face, wherein the first main face comprises at least one first vertex angle, wherein two margins on two sides of the at least one first vertex angle are coupled to the at least one first vertex angle, wherein cross sections in a through-thickness direction of the panel and respectively vertical to the two margins coupled to the at least one first vertex angle are respectively a first through-thickness cross section and a second through-thickness cross section, wherein a location of the at least one first vertex angle of the first main face is coupled to the first side face at a junction of the location of the at least one first vertex angle and the first side face using a first vertex angle cambered face, wherein an inner-side face and an outer-side face of the at least one first vertex angle cambered face is separately in a shape of a camber line on the first through-thickness cross section that passes through the at least one first vertex angle, wherein the inner-side face and the outer-side face of the first vertex angle cambered face is separately in a shape of a camber line on the second through-thickness cross section that passes through the at least one first vertex angle, wherein a shape of the first main face is a rectangle, wherein the margin of the first main face comprises a first width edge and a second width edge in a width direction of the first main face, wherein a first cambered face is used for coupling at a junction of the first width edge and the first side face, wherein a second cambered face is used for coupling at a junction of the second width edge and the first side face, and wherein the first cambered face and the second cambered face is asymmetrical relative to a second cross section located at a central position in a length direction of the terminal.

15. The terminal of claim 14, wherein the two margins of the first main face located on the two sides of the at least one first vertex angle are straight edges or cambered edges.

16. The terminal of claim 14, wherein the first side face is a cambered side face or a plate side face.

17. The terminal of claim 14, wherein a thickness of the panel is even, and wherein the inner-side face and the outer-side face of the panel are of a consistent shape.

18. The terminal of claim 14, further comprising a middle frame, and wherein the panel is assembled on one side of the middle frame.

19. The terminal of claim 14, wherein a third cambered face is used for coupling at a junction of the first length edge and the first side face, wherein a fourth cambered face is used for coupling at a junction of the second length edge and the first side face, and wherein the third cambered face and the fourth cambered face are symmetrical relative to a third cross section located at a central position in a width direction of the terminal.

20. The terminal of claim 14, wherein the panel is a display screen.

* * * * *